US012585015B1

(12) United States Patent
Srivastav et al.

(10) Patent No.: US 12,585,015 B1
(45) Date of Patent: Mar. 24, 2026

(54) SENSOR FUSION FOR DETECTING FALSE-POSITIVE OBSERVATIONS

(71) Applicant: Zoox, Inc., Foster City, CA (US)

(72) Inventors: Arvind Srivastav, San Francisco, CA (US); Jifei Qian, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 875 days.

(21) Appl. No.: 17/901,620

(22) Filed: Sep. 1, 2022

(51) Int. Cl.
*G01C 3/08* (2006.01)
*G01S 13/86* (2006.01)
*G01S 17/04* (2020.01)
*G01S 17/58* (2006.01)

(52) U.S. Cl.
CPC ............ *G01S 17/04* (2020.01); *G01S 13/865* (2013.01); *G01S 17/58* (2013.01)

(58) Field of Classification Search
CPC ......... G01S 17/04; G01S 17/58; G01S 13/865
See application file for complete search history.

(56) References Cited

U.S. PATENT DOCUMENTS

2023/0017983 A1 * 1/2023 Kunz .................... G01S 13/931
2023/0046274 A1 * 2/2023 Chen .................... G01S 13/931

FOREIGN PATENT DOCUMENTS

DE 102020005755 A1 * 3/2022 ............. G01S 17/42

* cited by examiner

*Primary Examiner* — Mark Hellner
(74) *Attorney, Agent, or Firm* — Lee & Hayes, P.C.

(57) ABSTRACT

Techniques for identifying false-positive sensor observations include using sensor observations from different sensor modalities. The techniques may include receiving first sensor data (e.g., radar data) and second sensor data (e.g., lidar data) generated by different types of sensors of a vehicle that is operating in an environment. The techniques may also include determining an absence of an observation in the first sensor data at a location in the environment where an observation is indicated in the second sensor data. The techniques may also include receiving an indication that a retroreflective surface is present in the environment. Based at least in part on at least one of the retroreflective surface being present in the environment or the absence of a radar observation at the location in the environment where a lidar observation is indicated, the techniques may include determining that the observation in the second sensor data is a false-positive observation.

20 Claims, 6 Drawing Sheets

200

202

306

308

400

SENSOR FUSION FOR DETECTING FALSE-POSITIVE OBSERVATIONS

BACKGROUND

Sensors can be used in various applications for data generation. Many of today's sensors are utilized in different scenarios to determine information associated with an environment. For instance, some of these sensors may be used to determine where buildings or other objects are located in an environment. Although these sensors are reliable in many situations, specific scenarios still exist in which these sensors can experience abnormalities and/or generate unreliable data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
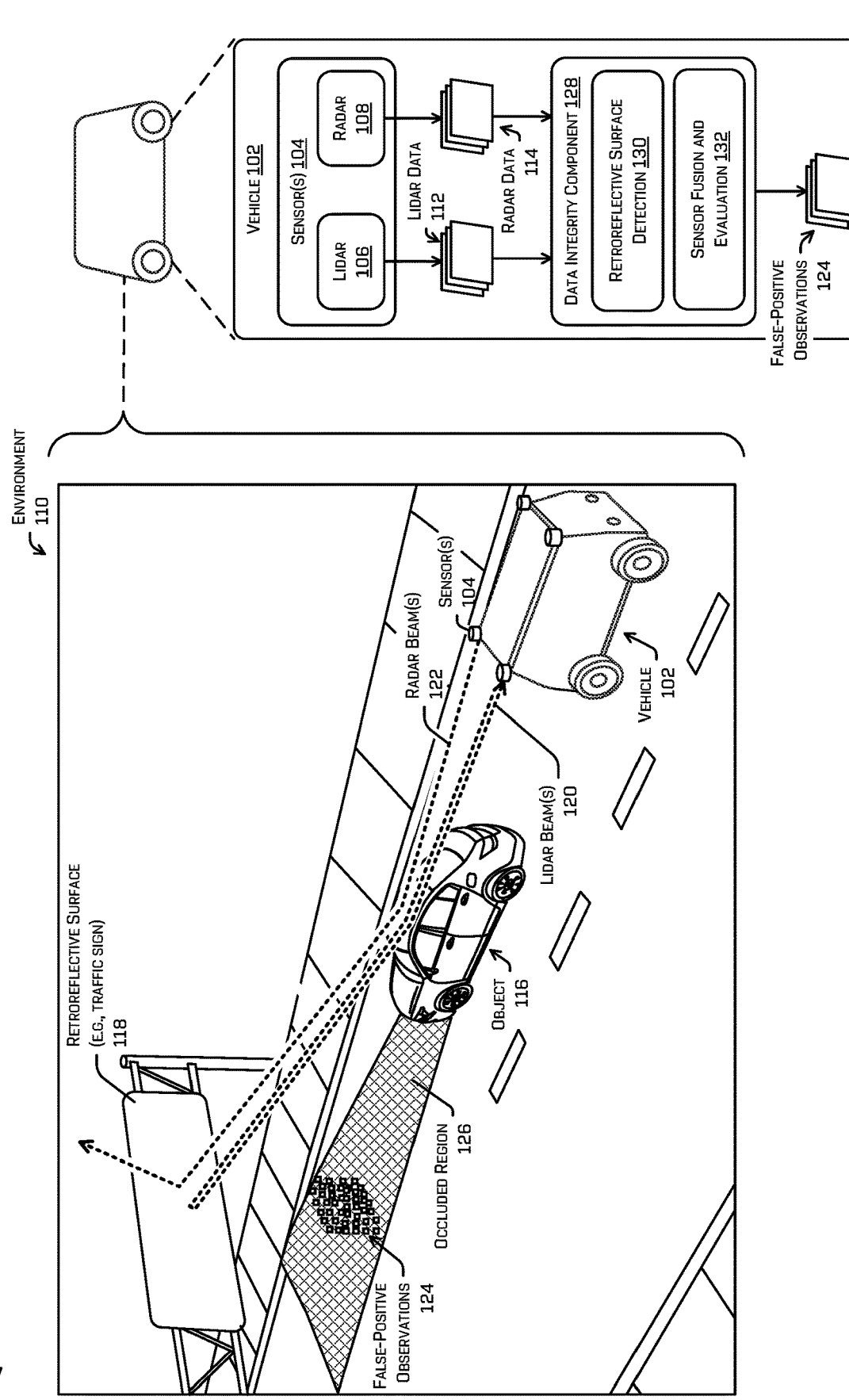
FIG. 1 illustrates an example process associated with identifying false-positive sensor observations.

As noted above, although today's sensors are reliable in many situations, specific scenarios still exist in which certain types of sensors can experience abnormalities and/or generate unreliable data. For example, in lidar data generated by a lidar sensor of a vehicle, relatively stationary objects can oftentimes be detected in an environment in close proximity of—typically below—overhead traffic signs. These objects are frequently determined to be caused by false-positive sensor observations (e.g., sensor observations that are indicative of a presence of an object, structure, etc. that does not actually exist in real-life). These false-positive sensor observations may be caused by sensor beam "multipathing," a phenomenon in which one or more beam(s) of a sensor (e.g., laser beams of a lidar sensor, electromagnetic or radio waves of a radar sensor, etc.) are deflected off of a first object and then reflected back to the sensor off of certain types of a second object, such as retroreflective surfaces. That is, instead of the sensor beam(s) directly reflecting back to the sensor from the first object, or instead of the beam(s) not returning to the sensor at all, the sensor beam(s) are deflected from the first object to the second object, and then reflected back to the sensor from the second object (in many cases, this involves another deflection off of the first object prior to returning to the sensor). When this occurs, however, it is difficult to differentiate a false-positive observation from a true observation due to the multipath of the lidar beam(s) off of an actual object that the lidar sensor is properly detecting. In the context of autonomous vehicles, this can cause safety issues because the autonomous vehicle should not arbitrarily ignore some sensor observations without definitively knowing if it is a true (e.g., not a false-positive) observation or not. That is, the autonomous vehicle should only flag sensor observations as false-positives if it has a high confidence that they true are false-positives, otherwise the autonomous vehicle may ignore an observation that actually corresponds with a real object.

In many cases, these false-positive sensor observations, as described above and herein, are caused by retro-reflectivity of a traffic sign. Retroreflection, as distinguished from normal reflection (e.g., mirror reflection), is a phenomenon in which a wave (e.g., light) reflects back in the direction it came from. To enable drivers of vehicles to see traffic signs well at night and from far distances, most traffic signs are coated with retro-reflective materials. However, because many sensor beam wavelengths (including lidar) are in the order of visible light wavelength, some of these sensor beams also undergo strong retro-reflection as well. As such, if a reflective object (e.g., a car window, the top of a car, etc.) creates a multipath between the sensor beam and a traffic sign (i.e., the sensor beam bounces off the object and reaches the traffic sign), the retro-reflective coating on the traffic sign will return the beam in the direction it came from, which is the intermediary object and then the sensor head unit. From the perspective of the sensor, however, it seems as if the return is coming from an actual object in a straight line (relative to the initial direction of the sensor beam before being deflected) at a distance half of the sensor beam's round-trip time.

This application describes technologies that, among other things, may be used to identify or otherwise determine false-positive sensor observations caused by sensor data abnormalities, such as those described above caused by deflected sensor beam(s) reflecting off of retroreflective surfaces. For example, while some types of sensors (e.g., lidar) are affected by retro-reflective surfaces (e.g., traffic signs) other types of sensors, such as radar, are not. This is because the beam wavelengths for these other types of sensors are larger than the size of the retroreflectors. Additionally, traffic signs and other retroreflective surfaces are usually made of metals and the smooth surface behaves like a mirror-like reflector for these other types of sensors. So, unlike a lidar beam, for instance, that is reflected back in the direction it came from, radar beams (as well as other sensor beams) can reflect off these retroreflective surfaces/traffic signs at an angle opposite their angle of incidence, mitigating creation of false-positive sensor observations, though there may be sensor observations from the contours of the surface/traffic sign and/or from any structure that supports the surface/traffic sign.

Because some sensors are affected differently by retroreflective surfaces/materials, the observations from these sensors may be used to determine when a false-positive sensor observation is present in other sensor data. For instance, lidar data and radar data may be received, respectively, from a lidar sensor and a radar sensor of a vehicle that is operating in an environment. In some examples, the lidar data and the radar data may be analyzed individually and/or in combination using sensor fusion techniques, and a determination may be made that one or more radar observation(s) is/are absent from a location in the environment where one or more lidar observation(s) are indicated. Additionally, a determination may be made (e.g., based at least in part on sensor data, map data, etc.) that a retroreflective surface is present in the environment. Based at least in part on the retroreflective surface being present in the environment and based at least in part on the inconsistency between the lidar observation(s) and the radar observation(s), a determination may be made that the lidar observation is a false-positive observation.

In some examples, one or more correlated conditions may further be determined that support the determination that the lidar observation(s) is/are false-positive observation(s). For instance, if the lidar observation(s) are substantially stationary (e.g., low velocity) in general and/or relative to other objects in the environment (or other observations) over a period of time or over a series of frames of lidar data, then this condition may be indicative that the lidar observation(s) are false-positive observation(s). Additionally, or alternatively, if the lidar observation(s) are located within a region of the environment that is occluded from view of the lidar sensor and/or the radar sensor, this condition may be indicative that the lidar observation(s) are false-positive observation(s). For instance, there may be another object in the environment that is in a direct line of sight between the sensor(s) and the observation(s). Another correlated condition that may be indicative that the lidar observation(s) are false-positive observation(s) is the proximity of the lidar observation(s) to the retroreflective surface. For instance, if the lidar observation(s) are below the retroreflective surface, this may be a strong indication that the observation(s) are false-positives. As another example, if a distance between the lidar observation(s) and the vehicle is roughly the same as the distance between the vehicle and the retroreflective surface, this may be another indicator of a false-positive. Techniques for tracking information associated with an object, such as velocities, positions, acceleration, and/or headings, are described in U.S. patent application Ser. No. 16/866,865, filed on May 5, 2020, the entire contents of which is incorporated herein by reference in its entirety and for all purposes.

Although many of the examples, described herein are with respect to lidar observations and radar observations, it is to be appreciated that the techniques described herein can be used with other types of sensor observations as well, including, but not limited to, image data, time of flight data, radar data, lidar data (including both spinning lidar and flash lidar), ultrasound data, sonar data, etc. Additionally, the techniques of this disclosure can be applied for determining false-positive observations produced by any type of sensors commonly used in automobiles, aircraft, watercraft, locomotives, and the like.

By way of example, and not limitation, a method according to the technologies described herein may include receiving sensor data generated by different sensors associated with a vehicle. For instance, the sensor data may include lidar data generated by a lidar sensor and radar data generated by a radar sensor. In some examples, the vehicle may be operating in an environment and the sensor data may include observations associated with the environment. In some examples, the observations may be respective points of a point cloud representing various locations in the environment at which beams, which were radiated from the sensor, reflected off of a surface (e.g., object, structure, etc.) and back to the sensor. For instance, lidar observations may be points of a lidar point cloud included in lidar data while radar observations may be points of a radar point cloud included in radar data. In some examples, the environment may be a real environment or a simulated environment (which may, in some cases, be based on a real environment).

In some examples, the techniques may include determining, based at least in part on the sensor data, an absence of a radar observation at a location in the environment where a lidar observation is indicated. In other words, an inconsistency between the lidar observation(s) and the radar observation(s) may be determined. For instance, in at least some examples the lidar sensor and the radar sensor may generate the lidar data and the radar data substantially contemporaneously during a same period of time (e.g., the lidar sensor and the radar sensor may capture sensor data at a same or substantially same frequency (e.g., 10 hz. 15 hz. 20 hz, etc.). As such, it may be presumed that many of the lidar observations included in the lidar data should have corresponding, or otherwise associated, radar observations included in the radar data. However, as discussed above and herein, lidar sensors can be affected by retroreflective surfaces such that beam(s) of the lidar sensor can be deflected (also referred to as "multipathed") off of another object in the environment and then reflected off of the retroreflective surface back to the lidar sensor, and this could contribute to the inconsistencies between lidar observations and radar observations. In some examples, determining the absence of the radar observation at the location in the environment where the lidar observation is indicated may be based at least in part on analyzing the sensor data (e.g., the lidar data and the radar data) individually and/or in combination using sensor fusion techniques. For instance, the two sets of observations may be analyzed and any duplicate or corresponding observation pairs in both the lidar data and the radar data may be a good indication that the data are accurate and consistent, and any remaining observations (e.g., which do not have a corresponding radar or lidar observation pair) may be further analyzed to determine if it is a false-positive. The existence of one or more other correlated conditions may increase the likelihood that the inconsistent lidar observation is a false-positive.

In some examples, the techniques may include receiving an indication that a retroreflective surface (e.g., traffic sign) is present in the environment. For instance, a determination may be made based at least in part on one or more of sensor data, map data, geolocation data, or the like that the retroreflective surface is present in the environment. Additionally, in some instances, a determination may be made that the retroreflective surface is proximate to the location where the inconsistency exists between the lidar observation(s) and radar observation(s). For instance, a location of the retroreflective surface may be determined and compared to the location of the inconsistency.

In some examples, the techniques may include determining that the lidar observation is a false-positive observation. For instance, it may be determined that the lidar observation is the false-positive observation based at least in part on the retroreflective surface being present in the environment, based at least in part on the absence of the radar observation at the location in the environment where the lidar observation is indicated, and/or based at least in part on a number of correlated conditions commonly present when a false-positive observation is caused by a retroreflective surface, such as an overhead traffic sign. In some examples, these correlated conditions may include a velocity associated with the lidar observation being a low velocity relative to other objects in the environment, the location of the inconsistency being positioned within an occluded region of the environment, and more as discussed below and herein.

In some examples, one correlated condition for determining that the lidar observation is the false-positive observation may be that the lidar observations are relatively stationary. As such, the techniques may include determining, based at least in part on a series of frames of the lidar data, that a difference in velocity between a velocity associated with the lidar observation and another velocity associated with another object in the environment meets or exceeds a threshold difference. In this way, determining that the lidar observation is the false-positive observation may be further based at least in part on the difference in velocity meeting or exceeding the threshold difference. In some examples, the threshold velocity may be a relative or average velocity of the other object and/or additional objects in the environment. Additionally, or alternatively, the threshold velocity may be less than the relative or average velocity of the other object (e.g., 5 m/s, 10 m/s, 15 m/s, etc. slower than the average velocity).

In some examples, another correlated condition for determining that the lidar observation is the false-positive observation may be that the location of the lidar observation is within an occluded portion of the environment. In some examples, the occluded portion of the environment may be a region of the environment that is not visible to any vision sensors (e.g., lidar, radar, image, etc.) of the vehicle. As such, the techniques may include determining that the location where the lidar observation is indicated is within the occluded portion of the environment. In this way, determining that the lidar observation is the false-positive observation may be further based at least in part on the location being within the occluded portion of the environment.

In some examples, another correlated condition for determining that the lidar observation is the false-positive observation may be that the location of the lidar observation is located in proximity to the retroreflective surface. For instance, if the location of the lidar observation is below the retroreflective surface and/or within a threshold distance of the retroreflective surface, this may be a strong indicator that the observation is a false-positive. Additionally, or alternatively, if a distance between the location of the lidar observation and the vehicle is roughly the same as a distance between the vehicle and the retroreflective surface, this may be indicative that the observation is a false-positive. That is, a threshold proximity may be established that is based on a distance between the vehicle and the retroreflective surface. Techniques for determining if a lidar observation is in proximity to a retroreflective surface are discussed in U.S. patent application Ser. No. 17/876,347, filed on Jul. 28, 2022, the entire contents of which is incorporated herein by reference in its entirety and for all purposes. Accordingly, the techniques may include determining that the location where the lidar observation is indicated is within proximity of the retroreflective surface. In this way, determining that the lidar observation is the false-positive observation may further based at least in part on the location being within the proximity of the retroreflective surface.

In some examples, before concluding that a lidar observation is a false-positive observation, it may be a condition that the inconsistency between lidar observation(s) and radar observation(s) be present for a threshold number of frames of sensor data, a threshold period of time, or the like. For instance, determining that the lidar observation is the false-positive observation may be further based at least in part on determining, for a threshold series of frames of lidar data and radar data (or for a threshold period of time), that radar observations are absent at the location in the environment where lidar observations are indicating a presence of a potential object. In some examples, the threshold series of frames may be any number of frames, such as 2 frames, 3 frames, 4 frames, 5 frames, and so forth. Additionally, if the threshold is a period of time, the period of time may be any period of time, such as 100 milliseconds, 500 milliseconds, 1 second, etc.

According to the techniques described herein, several advantages in computer-related technology may be realized. For instance, by identifying false-positive sensor observations, processing power may be conserved by downstream components (e.g., perception component, planner component, prediction component, etc.) not having to process the false-positive observation(s) and/or treat the false-positive observation(s) as it would otherwise treat a sensor observation associated with a real object. This allows the downstream computing devices and/or components to operate with greater efficiency by refraining from wasting compute power processing sensor observation(s) that do not need to be processed.

Additionally, the techniques described herein improve the safe operation of autonomous vehicles. For instance, by identifying false-positive sensor observations, a planner component of a vehicle can more accurately determine planned trajectories for the vehicle to follow in the environment, without those trajectories being affected by false-positive sensor observations. Additionally, by identifying which observations are false-positives, the behavior of an autonomous vehicle can more closely resemble that of a human-operated vehicle, which would not change its trajectory (e.g., brake, swerve, accelerate, etc.) to compensate for an object that is not actually present in an environment.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. For example, the techniques can be utilized in semi-autonomous vehicles, driver assistance systems for manually driven vehicles, aviation or nautical contexts, manufacturing contexts, or in other contexts employing temporal sensor systems.

FIG. 1 illustrates an example process 100 associated with identifying false-positive sensor observations. In examples, the vehicle 102 may include one or more sensor(s) 104, such as lidar sensor(s) 106 and radar sensor(s) 108. In at least one example, the sensor(s) 104 may capture sensor data associated with an environment 110 surrounding the vehicle 102. For instance, the lidar sensor(s) 106 may generate lidar data 112 associated with the environment 110 and the radar sensor(s) 108 may generate radar data 114 associated with the environment 110. In at least one example, the sensor(s) 104 may include, in addition or in the alternative to the lidar sensor(s) 106 and/or the radar sensor(s) 108, image sensors, rolling shutter cameras, ultrasonic transducers, sonar sensors, location sensors (e.g., global positioning component (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time of flight (ToF) sensors, etc. In some examples, one or more of the sensor(s) 104 may be housed within one or more sensor pods coupled to the vehicle 102. In some instances, a single sensor pod may include one or more lidar sensors, image sensors, radar sensors, time of flight sensors, accelerometers, and/or the like. In examples, the type(s) of sensor data generated by the sensor(s) 104 may include, in addition to the lidar data 112 and the radar data

114, ultrasonic transducer data, sonar data, location data (e.g., global positioning component (GPS), compass, etc.), pose data, inertial data (e.g., inertial measurement units data, accelerometer data, magnetometer data, gyroscope data, etc.), image data (e.g., RGB data, IR data, intensity data, depth data, etc.), wheel encoder data, microphone data, environment sensor data (e.g., temperature sensor data, humidity sensor data, light sensor data, pressure sensor data, etc.), ToF sensor data, etc.

In examples, the environment 110 may include one or more objects, such as the object 116 that represents another vehicle, as well as pedestrians, cyclists, animals, vegetation, buildings, streetlights, street signs, etc. In some examples, the environment 110 may also include one or more retrore-flective surfaces, such as the retroreflective surface 118. The retroreflective surface 118 shown in FIG. 1 represents an overhead traffic sign, but other retroreflective surfaces and/or retroreflective objects are possible. As used herein, a "retroreflective surface" includes any surface, material, or device that is capable of reflecting a wave (e.g., light) or other radiation back towards its source in the direction it came from, regardless of the angle at which the wave or other radiation contacts the retroreflective surface. Additionally, it is to be appreciated that the techniques of this disclosure are possible in the absence of a retroreflective surface, and the techniques of this disclosure may be possible in cases such as when a reflective surface reflects a waver or other radiation back towards its source, such as when a wave hits a reflective surface at a perpendicular angle.

In some examples, a lidar sensor 106 of the vehicle 102 may radiate one or more lidar beam(s) 120 in the environment 110 to generate the lidar data 112. Similarly, a radar sensor 108 of the vehicle 102 may radiate one or more radar beam(s) 122 in the environment 110 to generate the radar data 114. For instance, the lidar sensor 106 and the radar sensor 108 may generate their respective sensor data associated with the environment 110 by targeting areas of the environment 110 with these beam(s) (e.g., light or laser in the case of lidar and electromagnetic waves or microwave energy in the case of radar) and measuring the time for the reflected beam(s) to return to the sensor. In some instances, these sensor beam(s) may deflect off objects in the environment and then contact a retroreflective surface. However, depending on the modality of sensor, how beam(s) behave after contacting a retroreflective surface may vary.

For example, FIG. 1 includes an example illustrating the differences in behavior between the lidar beam(s) 120 and the radar beam(s) 122 after contacting the retroreflective surface 118. With respect to the radar beam(s) 122, after being emitted from the radar sensor of the vehicle 102, the radar beam(s) 122 deflect off the object 116 and then deflect off the retroreflective surface 118. Because the radar beam(s) 122 never actually return to the radar sensor of the vehicle 102, and instead are directed up into the sky, a radar observation will not be obtained from the radar beam(s) 122. In contrast, the lidar beam(s) 120, after being emitted from the lidar sensor of the vehicle 102, the lidar beam(s) 120 deflect off the object 116, contact and reflect off the retrore-flective surface 118, deflect again off the object 116, and then are directed back to the lidar sensor of the vehicle 102. Because the lidar beam(s) 120 actually reflect back to the lidar sensor of the vehicle 102, the lidar sensor will capture one or more false-positive observations 124, which are illustrated in FIG. 1 as being located within the occluded region 126.

In some examples, the vehicle 102 may include a data integrity component 128, which may be configured to identify which sensor observations are actually false-positive observations 124. In some examples, the data integrity component 128 may be part of, or otherwise associated with, a perception component of the vehicle 102. For instance, the data integrity component 128 may receive sensor data, such as the lidar data 112 and the radar data 114, and analyze the sensor data to determine which observations included in the sensor data are false-positive observations 124.

In examples, the data integrity component 128 may include a retroreflective surface detection component 130 and a sensor fusion and evaluation component 132. In some examples, the retroreflective surface detection component 130 may determine locations in the environment 110 where retroreflective surfaces are located, such as the location of the retroreflective surface 118. In some examples, the ret-roreflective surface detection component 130 may utilize sensor data, such as the lidar data 112, radar data 114, image data, or the like to determine the locations in the environ-ment 110 where the retroreflective surfaces are located. Additionally, or alternatively, the retroreflective surface detection component 130 may, in some instances, utilize map data (e.g., 3D map data, semantic map data, etc.) to determine the locations in the environment 110 where the retroreflective surfaces are located.

In some examples, the sensor fusion and evaluation component 132 may be configured to analyze and compare different sensor data frames, such as the lidar data 112 and the radar data 114, to determine locations in the environment 110 where inconsistencies in the sensor data are present. For instance, the sensor fusion and evaluation component 132 may determine, for one or more observations from a first sensor, that a corresponding set of observation(s) from a second sensor are not present. As one example, the sensor fusion and evaluation component 132 may detect an absence of a radar observation at a location in the environment 110 where a lidar observation is indicated (e.g., the false-positive observations 124. That is, in other words, the sensor fusion and evaluation component 132 may determine inconsisten-cies between observation(s) from one sensor and observa-tion(s) from another sensor.

In some examples, the data integrity component 128 may receive the lidar data 112 generated by the lidar sensor 106 and the radar data 114 generated by the radar sensor 108. In some examples, the lidar data 112 may include lidar obser-vations associated with the environment 110 and the radar data 114 may include radar observations associated with the environment 110. In some examples, the lidar and radar observations may be respective points of a point cloud representing various locations in the environment at which the lidar beam(s) 120 and the radar beam(s) 122 reflected off of a surface (e.g., object, structure, etc.) and back to the sensors. For instance, lidar observations may be points of a lidar point cloud included in the lidar data 112 while radar observations may be points of a radar point cloud included in radar data 114.

In some examples, the sensor fusion and evaluation component 132, as described above, may determine, based on the lidar data 112 and the radar data 114, an absence of a radar observation at a location in the environment 110 where a lidar observation is indicated. For instance, the lidar sensor 106 and the radar sensor 108 may generate the lidar data 112 and the radar data 114 substantially contempora-neously during a same period of time. As such, it may be presumed that many of the lidar observations included in the lidar data 112 should have corresponding, or otherwise associated, radar observations included in the radar data 114. However, as discussed above and herein, the lidar beam(s) 120 of the lidar sensor 106 can be affected by the retrore-flective surface 118 such that the lidar beam(s) 120 can be deflected (also or multipathed) off of the object 116 and then reflected off of the retroreflective surface 118 back to the lidar sensor 106, and this can contribute to the false-positive observations 124 in the lidar data 112 that are inconsistent with the radar observations in the radar data 114. In some examples, the sensor fusion and evaluation component 132 may determine the absence of the radar observation at the location in the environment 110 where the lidar observation is indicated based at least in part on analyzing the lidar data 112 and the radar data 114 individually and/or in combina-tion using sensor fusion techniques. For instance, the two sets of observations in the lidar data 112 and the radar data 114 may be analyzed by the sensor fusion and evaluation component 132, and any duplicate or corresponding obser-vation pairs in both the lidar data 112 and the radar data 114 may be removed, and any remaining observations (e.g., which do not have a corresponding radar or lidar observation pair) may be kept for further analysis to determine if it is a false-positive observation 124.

In some examples, the data integrity component 128 may receive an indication from the retroreflective surface detec-tion component 130 that the retroreflective surface 118 is present in the environment. For instance, a determination may be made, by the retroreflective surface detection com-ponent 130 and based at least in part on one or more of sensor data, map data, geolocation data, or the like, that the retroreflective surface 118 is present in the environment. For instance, the retroreflective surface detection component 130 may utilize image data captured by one or more image or lidar sensors of the vehicle 102 to detect a presence of the retroreflective surface 118 in the environment, or to classify the object as a retroreflective surface. In some examples, the indication may include an estimated location of the retrore-flective surface 118. Additionally, in some instances, a determination may be made by the data integrity component 128 that the retroreflective surface 118 is proximate to the location where the inconsistency exists between the lidar observation(s) and radar observation(s). For instance, a location of the retroreflective surface 118 may be determined and compared to the location of the false-positive observa-tions 124.

In some examples, the data integrity component 128 may determine that the lidar observation(s) are the false-positive observations 124. For instance, it may be determined that the lidar observations are false-positive observations 124 based at least in part on the retroreflective surface 118 being present in the environment 110, based at least in part on the absence of the radar observation at the location in the environment 110 where the lidar observation is indicated, and/or based at least in part on a number of correlated conditions commonly present when false-positive observa-tions 124 are caused by retroreflective surfaces, such as an overhead traffic sign. In some examples, these correlated conditions may include a velocity associated with the lidar observation being a low velocity relative to other objects (e.g., the object 116, the vehicle 102 itself, etc.) in the environment, the location of the inconsistency being posi-tioned within an occluded region 126 of the environment 110, and more as discussed herein.

In some examples, one correlated condition for the data integrity component 128 determining that the lidar obser-vations are false-positive observations 124 may be that the lidar observations are relatively stationary (e.g., the velocity is 0 m/s, less than 1 m/s, etc.). In some examples, the techniques may include determining, based at least in part on a series of frames of the lidar data 112, that a difference in velocity between a velocity associated with the lidar obser-vation and another velocity associated with another object 116 in the environment meets or exceeds a threshold differ-ence. Additionally, or alternatively, a difference in velocity between the vehicle 102 and the lidar observations may also be indicative that they are false-positive observations 124. In this way, determining that the lidar observations are the false-positive observations 124 may be further based at least in part on the difference in velocity meeting or exceeding the threshold difference.

In some examples, another correlated condition for the data integrity component 128 determining that the lidar observations are the false-positive observations 124 may be that the locations of the lidar observations are within an occluded region 126 of the environment 110. In some examples, the occluded region 126 of the environment 110 may be a region of the environment 110 that is not visible to any vision sensors (e.g., lidar, radar, image, etc.) of the vehicle 102. As such, the data integrity component 128 may determine that the location where the lidar observations are indicated is within the occluded region 126 of the environ-ment 110. In this way, determining that the lidar observa-tions are the false-positive observations 124 may further based at least in part on the location being within the occluded region 126 of the environment 110. In some examples, the occluded region 126 of the environment 110 may be occluded by a reflective object (e.g., an object that a sensor beam can reflect off). That is, sensor observations may be received that are associated with an object and the potential false-positive observations may be behind the object.

In some examples, another correlated condition for the data integrity component 128 determining that the lidar observations are the false-positive observations 124 may be that the location of the lidar observations are located in proximity to the retroreflective surface 118. For instance, if the location of the lidar observations are below the retrore-flective surface 118, as shown, this may be a strong indicator that the observations are false-positives. Additionally, or alternatively, if a distance between the location of the lidar observations and the vehicle 102 is roughly the same as a distance between the vehicle 102 and the retroreflective surface 118, this may be indicative that the observations are false-positives. That is, a threshold proximity may be estab-lished that is based on a distance between the vehicle 102 and the retroreflective surface 118. Techniques for determin-ing if a lidar observation is in proximity to a retroreflective surface are discussed in U.S. patent application Ser. No. 17/876,347, filed on Jul. 28, 2022, the entire contents of which is incorporated herein by reference in its entirety and for all purposes. Accordingly, the data integrity component 128 may determine that the location where the lidar obser-vations are indicated is within proximity of the retroreflec-tive surface 118. In this way, determining that the lidar observations are the false-positive observations 124 may further based at least in part on the location being within the proximity of the retroreflective surface 118.

In some examples, before concluding that the lidar obser-vations are the false-positive observations 124, it may be a condition that the inconsistency between lidar observation(s) and radar observation(s) be present for a threshold number of frames of sensor data, a threshold period of time, or the like. For instance, determining that the lidar observations are the false-positive observations 124 may be further based at least in part on determining, by the data integrity component 128, that for a threshold series of frames of lidar data 112 and radar data 114 (or for a threshold period of time), that radar observations are absent at the location in the environment 110 where lidar observations are indicating a presence of a potential object.

Figure 2A:
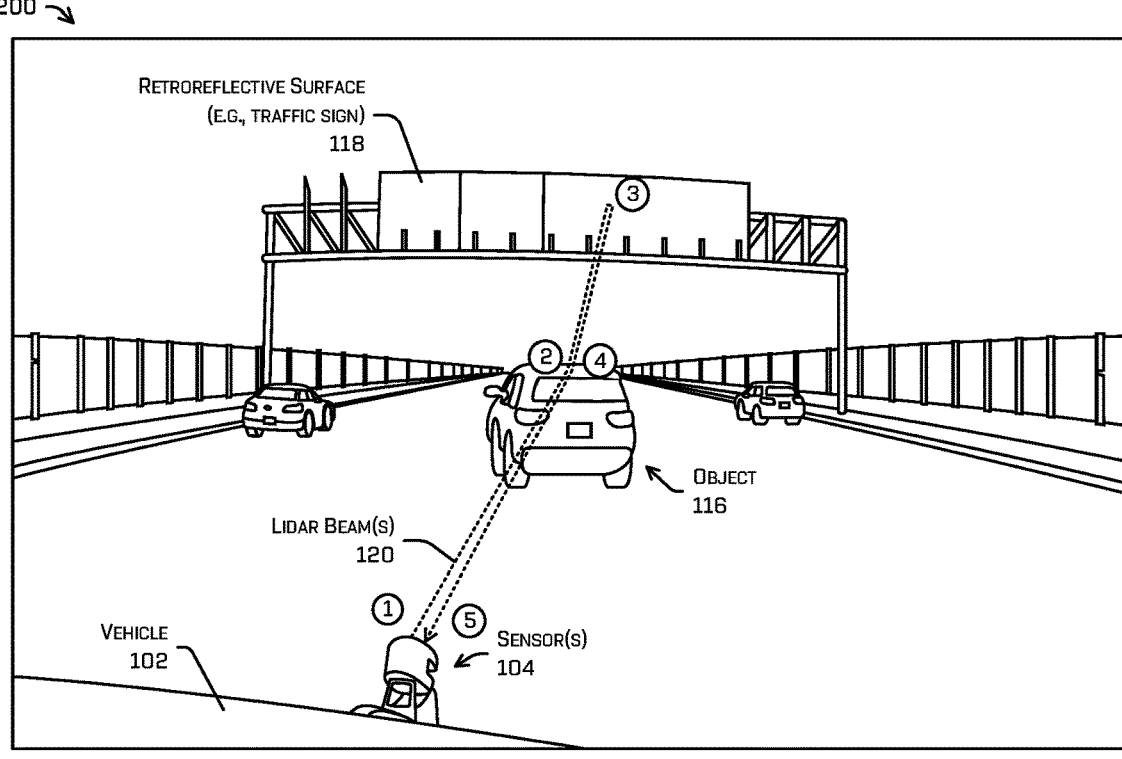
FIGS. 2A and 2B illustrate differences in behavior of different types of sensor modalities.
Figure 2B:
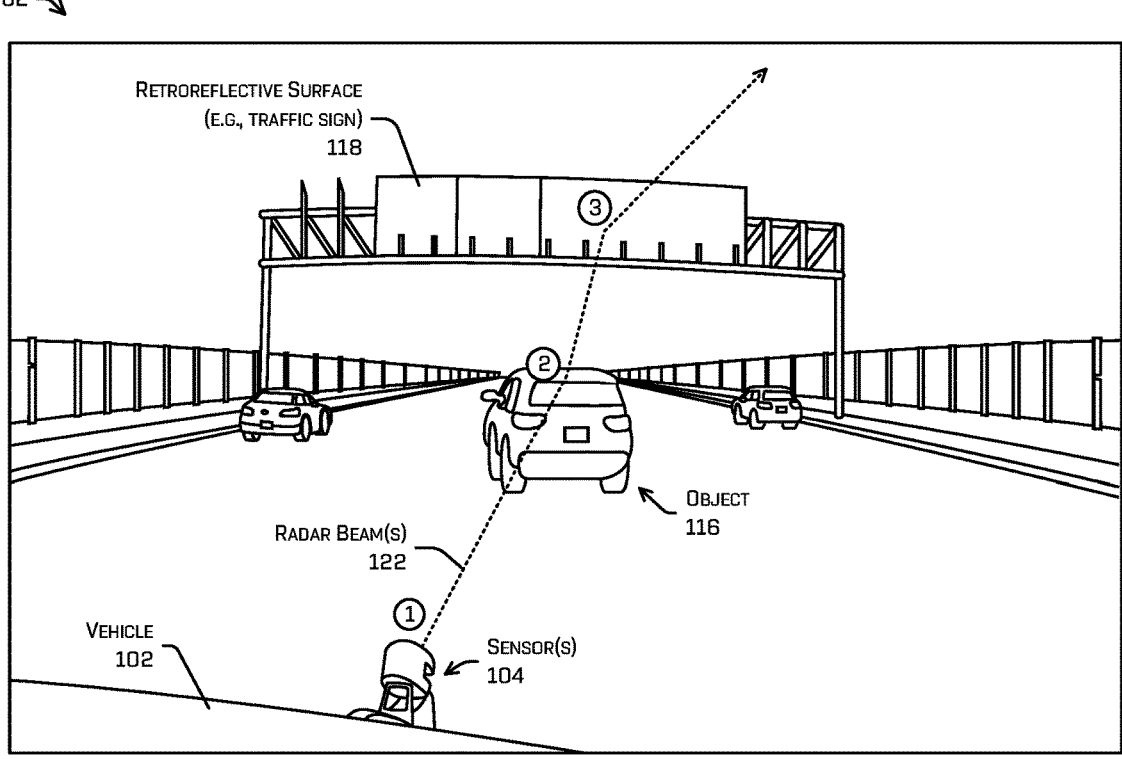

FIGS. 2A and 2B illustrate differences in behavior of different types of sensor modalities. For instance, the scene 200 of FIG. 2A illustrates a scenario in which lidar beam(s) 120 are emitted from the sensor(s) 104 (e.g., a sensor pod) of the vehicle 102. At "1," the lidar beam(s) 120 are emitted from the sensor(s) 104. At "2," the lidar beam(s) 120 deflect off of the object 116, which is the top of a vehicle. At "3," the lidar beam(s) 120 contact the retroreflective surface 118 and reflect off the retroreflective surface 118 in the direction the lidar beam(s) 120 came from. At "4," the lidar beam(s) 120 deflect off the object 116 and are directed back toward the sensor(s) 104 of the vehicle 102. And, at "5," the lidar beam(s) 120 return to the sensor(s) 104 of the vehicle 102.

In contrast, the scene 202 of FIG. 2B illustrates another scenario in which radar beam(s) 122 are emitted from the sensor(s) 104 of the vehicle 102. At "1," the radar beam(s) 122 are emitted from the sensor(s) 104. At "2," the radar beam(s) 122 deflect off of the object 116. And, at "3," the radar beam(s) 122 contact the retroreflective surface 118 and deflect off the retroreflective surface 118 in an upward direction. That is, because the radar beam(s) 122 are not affected by the retroreflective properties of the retroreflective surface 118, the radar beam(s) 122 deflect off the retroreflective surface 118 as if it were any other mirror-like reflective surface.

Figure 3A:
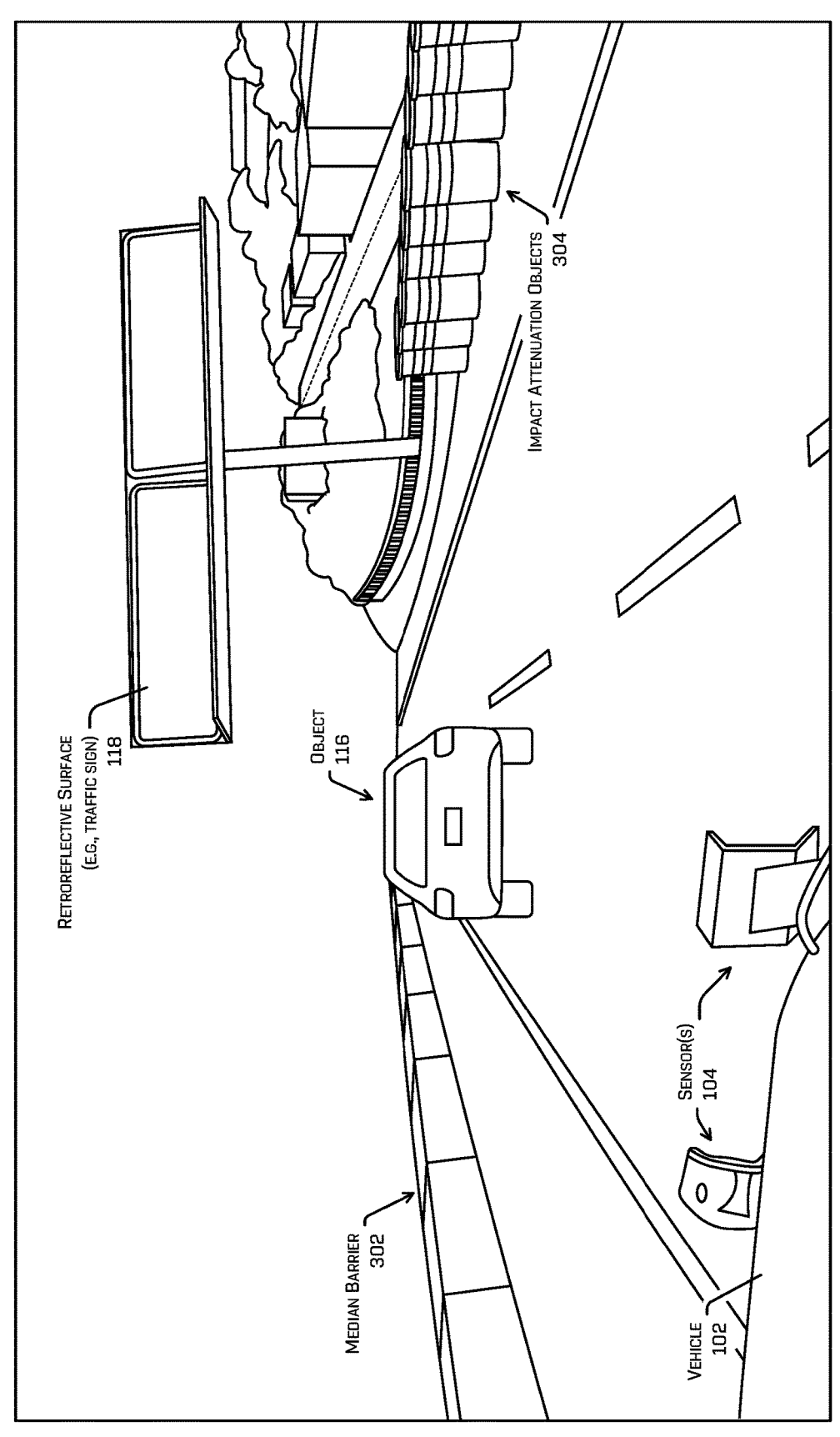
FIG. 3A is a passenger perspective view of a vehicle operating in an environment that includes a retroreflective surface.
Figure 3B:
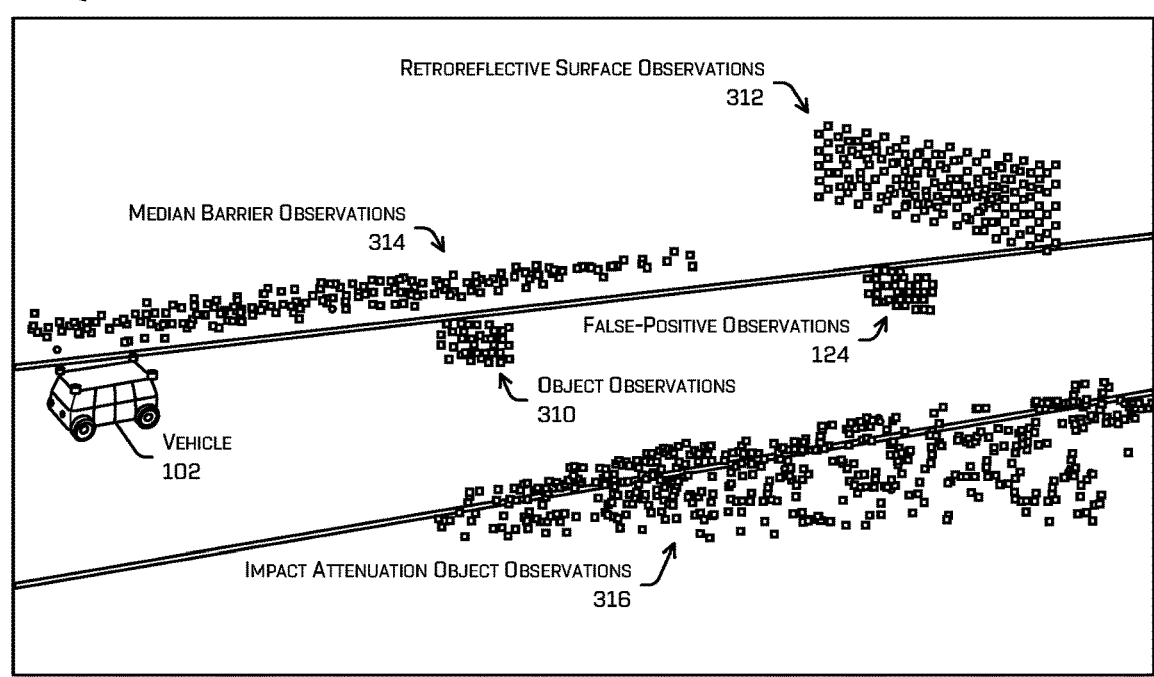
FIGS. 3B and 3C are perspective views illustrating differences in example sensor data observations generated by different sensor modalities of the vehicle.
Figure 3C:
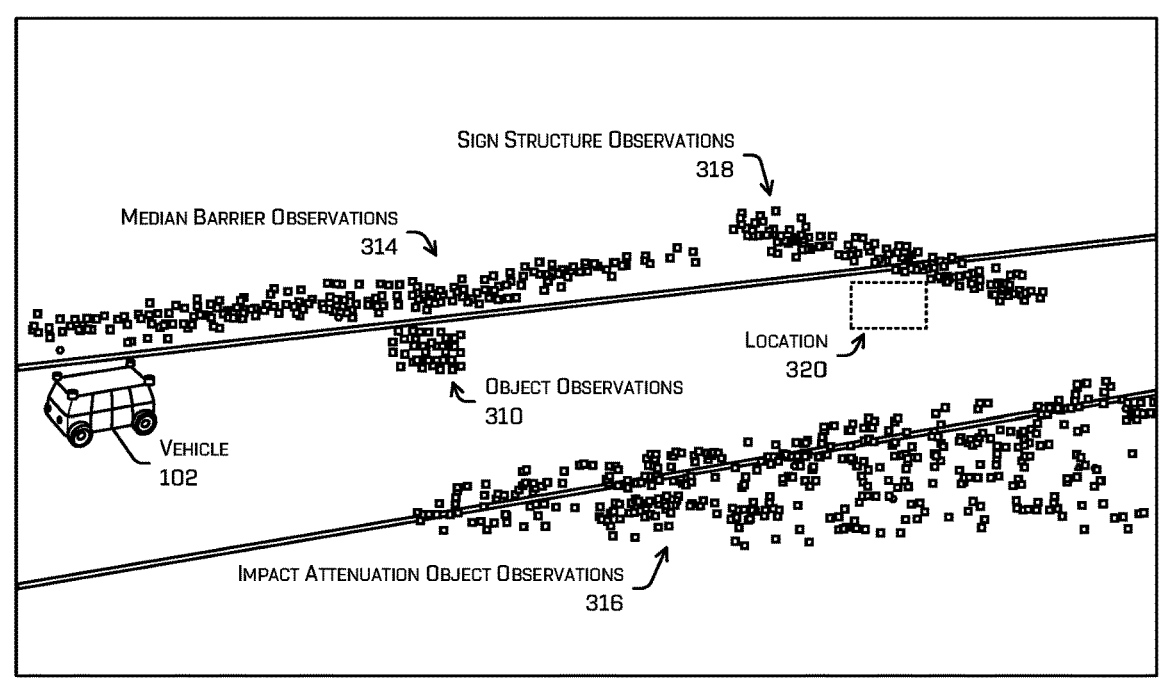

FIG. 3A is a passenger perspective view of a vehicle operating in an environment 300 that includes a retroreflective surface 118. FIGS. 3B and 3C are perspective views illustrating differences in example frames 306 and 308 of sensor data that include observations generated by different sensor modalities of the vehicle 102. The environment 300 shown in FIG. 3A includes an object 116, a retroreflective surface 118, a median barrier 302, and impact attenuation objects 304.

With respect to the frame 306 of sensor data shown in FIG. 3B, the frame 306 may be representative of lidar data including lidar observations. For instance, the observations included in the lidar data include object observations 310 associated with the object 116, retroreflective surface observations 312 associated with the retroreflective surface 118, median barrier observations 314 associated with the median barrier 302, and impact attenuation object observations 316 associated with the impact attenuation objects 304. Additionally, the observations include the false-positive observations 124, which may be caused by the lidar beam deflecting off of the object 116 and then reflecting off of the retroreflective surface 118 back to the vehicle 102. In such cases, the false-positive observations 124 may be located below the retroreflective surface 118. This may be because the lidar sensor is unaware that the beam was deflected off of the object 116.

For example, from the perspective of the lidar sensor, the lidar sensor believes that it emitted a beam in a substantially horizontal direction (e.g., roughly parallel to the road surface) and that beam reflected off an object that is located in that horizontal direction. Additionally, the lidar sensor determines the distance to the object based on the amount of time it took for the lidar beam to return to the lidar sensor after being emitted. However, the lidar sensor is unaware that the lidar beam actually deflected off another object, which changed the path of the lidar beam, and then the lidar beam was reflected back off the retroreflective surface 118 in the direction it came from. A such, the lidar sensor believes that there is an object in the direction it emitted the lidar beam and at a distance that is based on the amount of time it took for the lidar beam to report back to the sensor after being emitted. That is, the lidar sensor may assume that all returns/observations are direct path as the sensor may not have inherent knowledge to be able to differentiate between a direct path or multipath.

With respect to the frame 308 of FIG. 3C, the frame 308 may be representative of radar data including radar observations. For instance, the observations included in the radar data include several corresponding observations to those included in the lidar data, such as the object observations 310, the median barrier observations 314, and the impact attenuation object observations 316. Additionally, although the radar sensor may not be able to generate observations associated with the retroreflective surface 118, the radar data may include sign structure observations 318 where the radar sensor detected the structure supporting the retroreflective traffic sign. In some examples, techniques may be used to filter out above ground observations that do not directly impact the decision making of the vehicle 102, such as the sign structure observations 318 and the retroreflective surface observations 312.

Additionally, in some examples, techniques may be used to identify corresponding observations between the different sensor data, as well as to identify which observations do not have corresponding observations across different sensor modalities to determine false-positives. For example, the techniques described herein may be used to determine that corresponding sensor observations are not present at the location 320 where the false-positive observations 124 are present. In some examples, sensor fusion techniques may be used, and all corresponding sensor observations may be filtered out of the sensor data, as well as any above-ground observations or other observations that do not impact the trajectory decision making of the vehicle 102. For instance, if such observations were filtered out of the frames 306 and 308, the only observations left remaining would be the false-positive observations 124.

Figure 4:
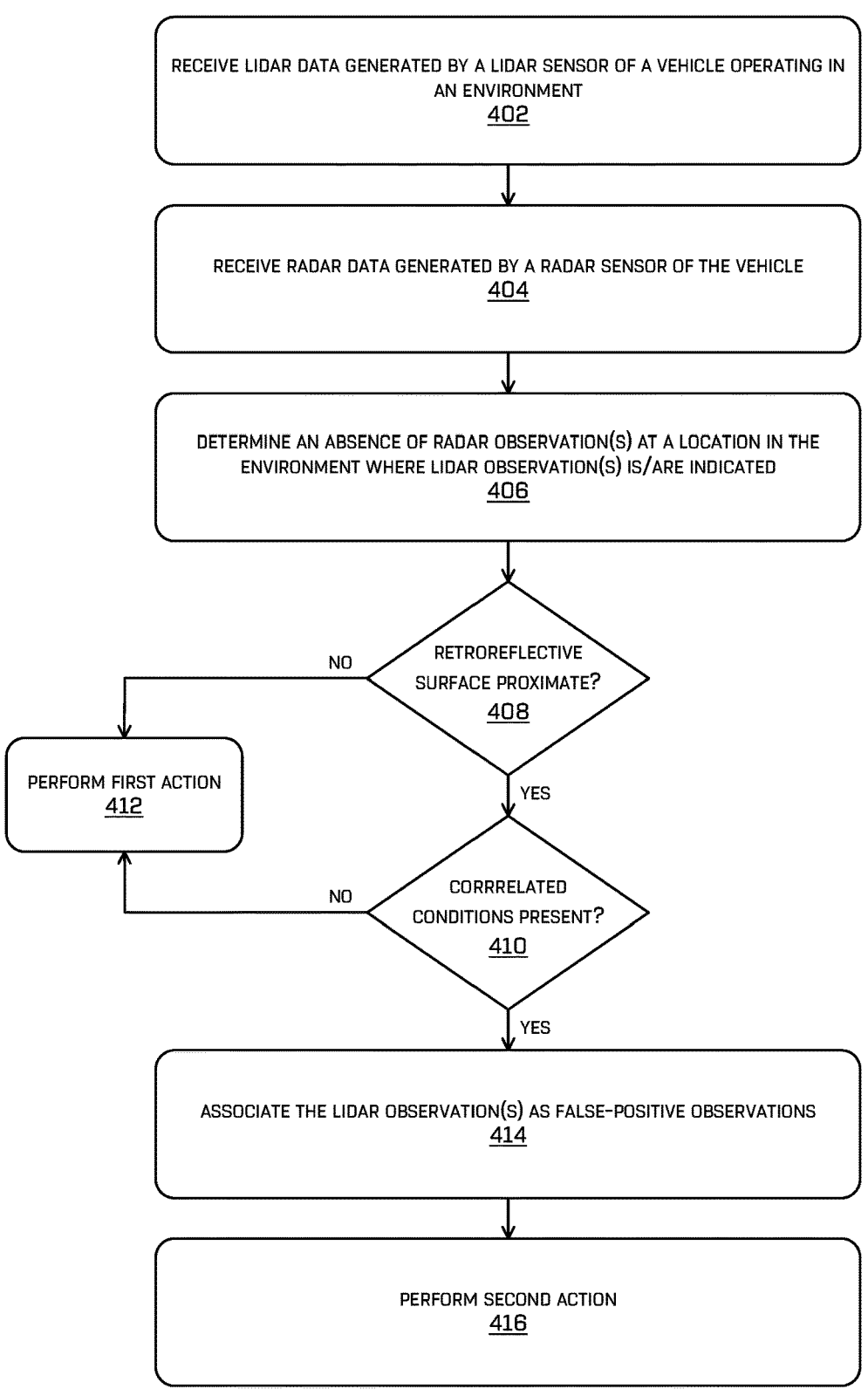
FIG. 4 is a flowchart illustrating an example process associated with the technologies disclosed herein for identifying false-positive sensor observations.

FIG. 4 is a flowchart illustrating an example process 400 associated with the technologies disclosed herein for identifying false-positive sensor observations. By way of example, the process 400 is illustrated as a logical flow graph, and each operation of it represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types.

In the process 400, the order in which the operations are described is not intended to be construed as a limitation, and any number of the described operations can be combined (or omitted) in any order and/or in parallel to implement the process 400. In some examples, multiple branches represent alternate implementations that may be used separately or in combination with other operations discussed herein. The process 400 illustrated may be described with reference to components and elements described above with reference to FIGS. 1-3C for convenience and ease of understanding. However, the process 400 is not limited to being performed using these components, and the components are not limited to performing the process 400.

The process 400 begins at operation 402, which includes receiving lidar data generated by a lidar sensor of a vehicle operating in an environment. For instance, the data integrity component 128 may receive the lidar data 112 generated by the lidar sensor 106 of the vehicle 102 operating in the environment 110. In some examples, the lidar data may include one or more observations associated with the environment. In some examples, the observations may be respective points of a lidar point cloud representing various locations in the environment at which beams, which were emitted from the lidar sensor, reflected off of a surface (e.g., object, structure, etc.) and back to the lidar sensor.

At operation 404, the process 400 includes receiving radar data generated by a radar sensor of the vehicle. For instance, the data integrity component 128 may receive the radar data 114 generated by the radar sensor 108 of the vehicle 102. In some examples, the radar data may include one or more observations associated with the environment. In some examples, the observations may be respective points of a radar point cloud representing various locations in the environment at which radar beams, which were emitted from the radar sensor, reflected off of a surface (e.g., object, structure, etc.) and back to the radar sensor.

At operation 406, the process 400 includes determining an absence of radar observation(s) at a location in the environment where lidar observation(s) is/are indicated. For instance, the sensor fusion and evaluation component 132 may determine the absence of radar observation(s) at a location 320 in the environment where lidar observation(s) is/are indicated. That is, in other words, an inconsistency between the lidar observation(s) and the radar observation(s) may be determined. For instance, in at least some examples the lidar sensor and the radar sensor may generate the lidar data and the radar data substantially contemporaneously during a same period of time. As such, it may be presumed that many of the lidar observations included in the lidar data should have corresponding, or otherwise associated, radar observations included in the radar data. However, as discussed above and herein, lidar sensors can be affected by retroreflective surfaces such that beam(s) of the lidar sensor can be deflected off of another object in the environment and then reflected off of the retroreflective surface back to the lidar sensor, and this can contribute to the inconsistencies between the lidar observation(s) and radar observation(s). In some examples, determining the absence of the radar observation at the location in the environment where the lidar observation is indicated may be based at least in part on analyzing the lidar data and the radar data individually and/or in combination using sensor fusion techniques. For instance, the two sets of observations may be analyzed and any duplicate or corresponding observation pairs in both the lidar data and the radar data may be removed, and any remaining observations (e.g., which do not have a corresponding radar or lidar observation pair) may be kept for further analysis to determine if it is a false-positive.

At operation 408, the process 400 includes determining whether a retroreflective surface is proximate the location or the vehicle. For instance, the retroreflective surface detection component 130 may determine that the retroreflective surface 118 is proximate the location 320 or the vehicle 102. Additionally, or alternatively, the retroreflective surface detection component 130 may detect the presence and location of the retroreflective surface 118 in the environment, and pass this information along to the data integrity component 128 and/or the sensor fusion and evaluation component 132 to determine if the retroreflective surface is proximate the location or the vehicle.

If, at operation 408, it is determined that a retroreflective surface is proximate the location or the vehicle, the process 400 proceeds to operation 410. However, if it is determined that a retroreflective surface is not proximate the location or the vehicle, the process 400 proceeds to operation 412.

At operation 410, the process 400 includes determining whether any correlated conditions are present. For instance, the data integrity component 128 or the sensor fusion and evaluation component 132 may determine whether the correlated conditions are present. In examples, the correlated conditions for determining that the lidar observation(s) are false-positive observation(s) may include: (i) that the lidar observation(s) are relatively stationary: (ii) that a velocity associated with the lidar observation(s) is relatively low compared to other objects in the environment or the vehicle itself: (iii) that the location of the lidar observation is within an occluded portion of the environment; and/or (iv) that the location of the lidar observation is located in proximity to the retroreflective surface.

If at operation 410, it is determined that one or more correlated conditions are present, the process 400 may proceed to operation 414. However, if no correlated conditions are present, the process 400 may proceed to operation 412.

At operation 412, the process 400 includes performing a first action. In some examples, the first action may include labeling the lidar observation(s) as an object in the environment. Additionally, or alternatively, the first action may include tracking the lidar observation(s) over a series of subsequent lidar data frames/observations to determine if the lidar observations disappear in subsequent frames, intensify in subsequent frames, if corresponding radar observations are detected in subsequent frames, or the like.

At operation 414, the process 400 includes associating the lidar observation(s) as false-positive observations. For instance, the data integrity component 128 may associate the lidar observation(s) as the false positive observations 124. In some examples, before associating the lidar observation(s) as the false-positive observations, the data integrity component 128 may determine whether the inconsistency between lidar observation(s) and radar observation(s) has been present for a threshold number of frames of sensor data, a threshold period of time, or the like. If so, the data integrity component 128 may associate the lidar observation(s) as the false-positive observation(s). If not, the data integrity component 128 may, in some instances, track the lidar observation(s) to see if they intensify, dissipate, if corresponding radar observations appear, etc. In some instances, the data integrity component 128 may track the lidar observation(s) for the threshold number of frames, period of time, etc.

At operation 416, the process 400 includes performing a second action. For instance, the data integrity component may perform the second action. In some instances, the second action may be to preclude the false-positive observation(s) from downstream processing (e.g., by a perception component, prediction component, planning component, etc.), to remove the false-positive observation(s) from the lidar data 112, to label the lidar observation(s) as the false-positive observation(s), to track the false-positive observation(s), or the like.

Figure 5:
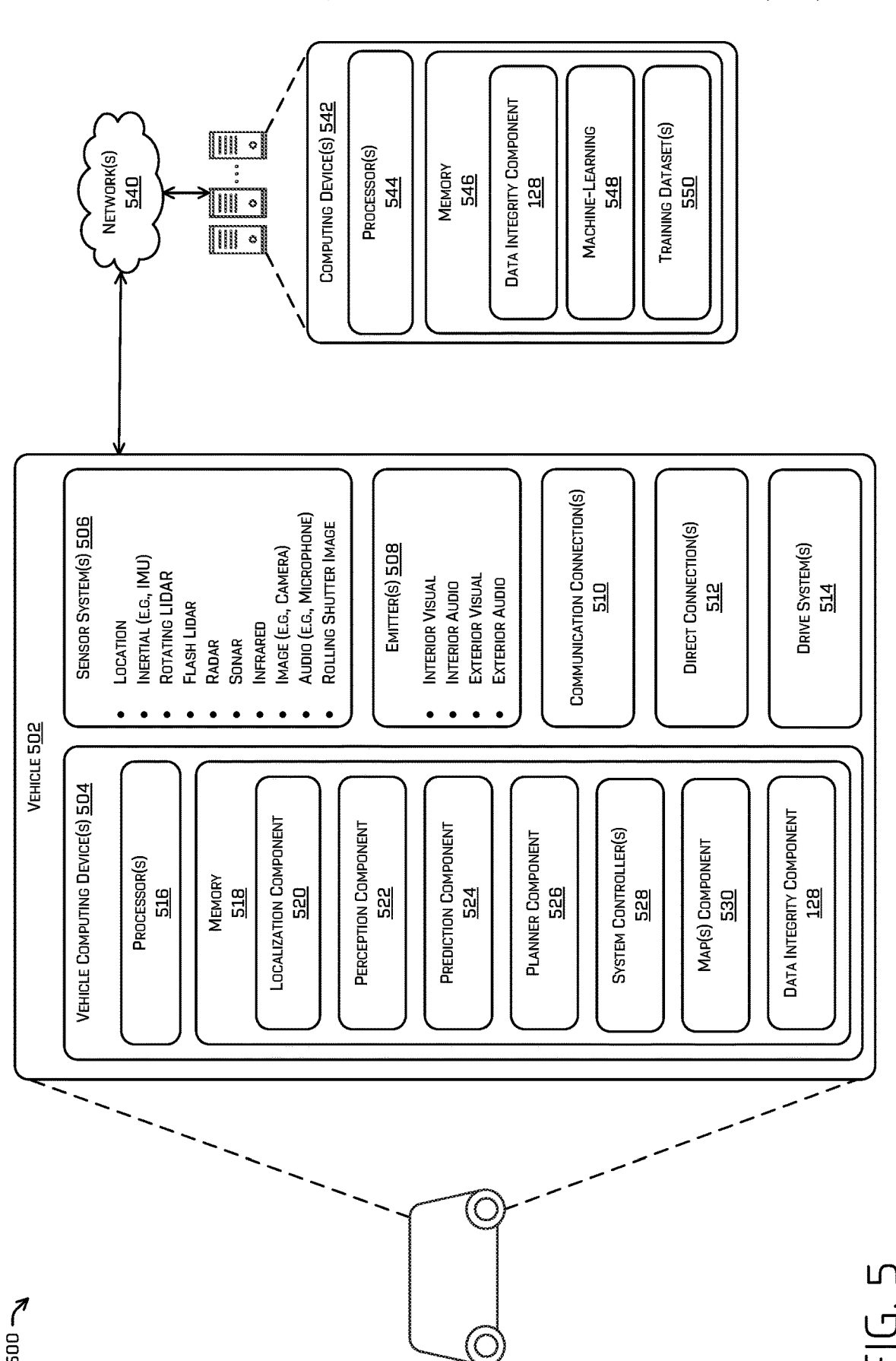
FIG. 5 is a block diagram illustrating an example system that may be used for performing the techniques described herein.

FIG. 5 is a block diagram illustrating an example system 500 that may be used for performing the techniques described herein. In at least one example, a vehicle 502, which can correspond to the vehicle 102 described above with reference to FIGS. 1-4., can include one or more vehicle computing device(s) 504, one or more sensor system(s) 506, one or more emitter(s) 508, one or more communication connection(s) 510, one or more direct connection(s) 512, and one or more drive system(s) 514.

In at least one example, a vehicle 502 can be an autonomous vehicle configured to operate according to a classification issued by the U.S. National Highway Traffic Safety Administration, which describes a vehicle capable of performing all safety-critical functions without the driver (or occupant) being expected to control the vehicle at any time. In such an example, since the vehicle 502 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 502 is an autonomous vehicle: however, the vehicle 502 could be any other type of vehicle. While only a single vehicle 502 is illustrated in FIG. 5, in a practical application, the example system 500 can include a plurality of vehicles, which, in some examples, can comprise a fleet of vehicles.

The vehicle computing device(s) 504 can include processor(s) 516 and memory 518 communicatively coupled with the processor(s) 516. In the illustrated example, the memory 518 of the vehicle computing device(s) 504 stores a localization component 520, a perception component 522, a prediction component 524, a planner component 526, one or more system controller(s) 528, a map(s) component 530, and the data integrity component 128.

In at least one example and as described above, the localization component 520 can determine a pose (position and orientation) of the vehicle 502 in relation to a local and/or global map based at least in part on sensor data received from the sensor system(s) 506 and/or map data associated with a map of an environment in which the vehicle 502 is operating (e.g., provided by the map(s) component 530). In at least one example, the localization component 520 can include, or be associated with, a calibration component that is capable of performing operations for calibrating (determining various intrinsic and extrinsic parameters associated with any one or more of the sensor system(s) 506), localizing, and mapping substantially simultaneously. In at least one example, the localization component 520 may provide localization data to the data integrity component 128 and the data integrity component 128 may use the localization data to determine a location of a retroreflective surface in an environment in relation to the vehicle 502.

In at least one example, the perception component 522 can perform object detection, segmentation, and/or classification based at least in part on sensor data received from the sensor system(s) 506. In at least one example, the perception component 522 can receive raw sensor data from the sensor system(s) 506. In at least one example, the perception component 522 can receive sensor data and can utilize one or more processing algorithms and/or machine-learned models to perform object detection, segmentation, and/or classification with respect to object(s) identified in the sensor data. In some examples, the perception component 522 can associate a bounding region (e.g., bounding box or otherwise an instance segmentation) with an identified object and can associate a confidence score associated with a classification of the identified object with the identified object. In at least one example, the perception component 522 can receive sensor data processed by the data integrity component 128 such that the sensor data does not include any false-positive observations.

The prediction component 524 can receive sensor data from the sensor system(s) 506, map data, and/or perception data output from the perception component 522 (e.g., processed sensor data) and can output predictions associated with one or more objects within the environment of the vehicle 502. Predictions can include predicted trajectories associated with objects in the environment in which the vehicle 502 is operating. In some examples, the prediction component 524 may receive outputs from the data integrity component 128 indicating which objects in an environment are false-positive objects, and the prediction component 524 may refrain from outputting predictions associated with those false-positive objects.

The planner component 526 may receive data, information, and/or outputs from the localization component 520, the perception component 522, the prediction component 524, the map(s) component 530, and/or the data integrity component 128 and may generate one or more proposed vehicle operations (e.g., proposed trajectories). Additional details of localization components, perception components, prediction components, and/or planner components that are usable can be found in U.S. Pat. No. 9,512,123, issued on Apr. 4, 2017, and U.S. Pat. No. 10,353,390, issued on Jul. 16, 2019, the entire contents of both of which are incorporated by reference herein in their entirety and for all purposes. In some examples (e.g., where the vehicle 502 is not an autonomous vehicle), one or more of the aforementioned components can be omitted from the vehicle 502.

In at least one example, the vehicle computing device(s) 504 can include one or more system controller(s) 528, which can be configured to control steering, propulsion, braking, safety, emitters, communication, and other systems of the vehicle 502. These system controller(s) 528 can communicate with and/or control corresponding systems of the drive system(s) 514 and/or other systems of the vehicle 502.

The map(s) component 530 may store one or more map(s) associated with an environment in which the vehicle 502 operates. In some examples, the map(s) component 530 may include functionality to generate new maps representing an environment in real-time as the vehicle 502 operates, update maps associated with the environment, or the like. In at least one example, the map(s) component 530 can provide map data to the perception component 522 and/or the data integrity component 128, and those components may use the map data to determine respective locations in the environment of retroreflective surfaces. In some examples, the map data may indicate known locations in the environment of retroreflective surfaces, locations in the environment where retroreflective surfaces have previously caused false-positive objects, locations in the environment that are more likely to include retroreflective surfaces, and the like.

While the components described above are illustrated as "onboard" the vehicle 502, in other implementations, the components can be remotely located and/or accessible to the vehicle 502. For instance, some or all of the components can be remotely located on the computing device(s) 542 and accessible to the vehicle 502 via one or more network(s) 540. Furthermore, while the components are described above as "components." such components can comprise one or more components and/or modules, which can be part of a system, for performing operations attributed to each of the components.

In at least one example, the localization component 520, the perception component 522, the prediction component 524, the planner component 526, the map(s) component 530, and/or the data integrity component 128 can process data, as described above, and can send their respective outputs over the network(s) 540, to computing device(s) 542. In at least one example, the localization component 520, the perception component 522, the prediction component 524, the planner component 526, the map(s) component 530, and/or the data integrity component 128 can send their respective outputs to the computing device(s) 542 at a particular frequency, after a lapse of a predetermined period of time, in near real-time, etc.

In at least one example, the sensor system(s) 506 can include lidar sensors (e.g., rotating lidar sensors, flash lidar sensors), radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.). ToF sensors, rolling shutter image sensors, etc. The sensor system(s) 506 can provide input to the vehicle computing device(s) 504. In some examples, the sensor system(s) 506 can preprocess at least some of the sensor data prior to sending the sensor data to the vehicle computing device(s) 504. In at least one example, the sensor system(s) 506 can send sensor data, via the network(s) 540, to the computing device(s) 542 at a particular frequency, after a lapse of a predetermined period of time, in near real-time, etc.

The vehicle 502 can also include one or more emitters 508 for emitting light and/or sound, as described above. The emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 508 can be positioned at various locations about the exterior and/or interior of the vehicle 502.

The vehicle 502 can also include communication connection(s) 510 that enable communication between the vehicle 502 and other local or remote computing device(s), such as the computing device(s) 542, as well as other remote or local computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device(s) 504 to another computing device or a network, such as network(s) 540. For example, the communications connection(s) 510 can enable Wi-Fi-based communication such as via frequencies defined by the IEEE 502.11 standards, short range wireless frequencies such as BLUETOOTH®, or any suitable wired or wireless communications protocol that enables the respective computing device to interface with the other computing device(s).

The direct connection(s) 512 can directly connect the drive system(s) 514 and other systems of the vehicle 502. In at least one example, the vehicle 502 can include drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include sensor component(s) to detect conditions of the drive system(s) 514 and/or the surroundings of the vehicle 502. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 514. In some cases, the sensor component(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle 502, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 514. Furthermore, the drive system(s) 514 also include communication connection(s) that enable communication by the respective drive system with other local or remote computing device(s).

In FIG. 5, the vehicle computing device(s) 504, sensor system(s) 506, emitter(s) 508, and the communication connection(s) 510 are shown onboard the vehicle 502. However, in some examples, the vehicle computing device(s) 504, sensor system(s) 506, emitter(s) 508, and the communication connection(s) 510 can be implemented outside of an actual vehicle (i.e., not onboard the vehicle 502).

As described above, the vehicle 502 can send data to the computing device(s) 542, via the network(s) 540. In some examples, the vehicle 502 can send raw sensor data to the computing device(s) 542. In other examples, the vehicle 502 can send processed sensor data and/or representations of sensor data to the computing device(s) 542 (e.g., data output from the localization component 520, the perception component 522, the prediction component 524, the planner component 526, the data integrity component 128, any machine-learned models, etc.). In some examples, the vehicle 502 can send data to the computing device(s) 542 at a particular frequency, after a lapse of a predetermined period of time, in near real-time, etc.

The computing device(s) 542 can receive the data (raw or processed) from the vehicle 502 and/or other data collection devices, as well as data from one or more third-party sources and/or systems. In at least one example, the computing device(s) 542 can include processor(s) 544 and memory 546 communicatively coupled with the processor(s) 544. In the illustrated example, the memory 546 of the computing device(s) 542 stores the data integrity component 128, a machine-learning component 548, and one or more training dataset(s) 550 for training the machine-learning component 548. In some examples, one or more of the systems and/or components can be associated with the vehicle 502 or other computing device(s) associated with the system 500 instead of, or in addition to, being associated with the memory 546 of the computing device(s) 542.

In some examples, the machine-learning component 548 may utilize the training dataset(s) 550 to train machine-learned models to perform some or all of the technologies disclosed herein for identifying false-positive sensor observations caused by retroreflective surfaces.

The processor(s) 516 of the vehicle 502 and the processor(s) 544 of the computing device(s) 542 can be any suitable processor capable of executing instructions to process data and perform operations as described herein. By way of example and not limitation, the processor(s) 516 and 544 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAS, etc.), and other hardware devices can also be considered processors in so far as they are configured to implement encoded instructions.

Memory 518 and 546 are examples of non-transitory computer-readable media. Memory 518 and 546 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in some examples, components of the vehicle 502 can be associated with the computing device(s) 542 and/or the components of the computing device(s) 542 can be associated with the vehicle 502. That is, the vehicle 502 can perform one or more of the functions associated with the computing device(s) 542, and vice versa.

Furthermore, while the vehicle computing device(s) 504 and the computing device(s) 542 are shown to include multiple components, in some examples, such components can be associated with more or fewer individual components. For example, the localization component 520, the perception component 522, the prediction component 524, the planner component 526, the map(s) component 530, and/or the data integrity component 128 can be combined into a single component. That is, while depicted as separate components, any one or more of the components can be combined.

EXAMPLE CLAUSES

A. A vehicle comprising: a lidar sensor: a radar sensor: one or more processors; and one or more non-transitory computer-readable media storing instructions that, when executed, cause the one or more processors to perform operations comprising: receiving, from the lidar sensor, lidar data associated with an environment surrounding the vehicle: receiving, from the radar sensor, radar data associated with the environment: determining, based at least in part on the lidar data and the radar data, an absence of a radar observation proximate to a location in the environment where a lidar observation has been received: determining that a retroreflective surface is proximate to the location: determining, based at least in part on a velocity associated with the lidar observation, that the lidar observation is substantially stationary: determining, based at least in part on at least one of (i) the absence of the radar observation proximate to the location, (ii) the retroreflective surface being proximate to the location, or (iii) the lidar observation being substantially stationary, a probability that the lidar observation is a false-positive observation; and based at least in part on probability being greater than a threshold probability, precluding a bounding region associated with the potential object from being included in perception data, the perception data having an effect on a trajectory of the vehicle.

B. The vehicle as recited in paragraph A, the operations further comprising determining that the location is within an occluded portion of the environment from the lidar sensor, wherein determining the probability that the lidar observation is the false-positive observation is further based at least in part on the location being within the occluded portion of the environment.

C. The vehicle as recited in any one of paragraphs A-B, wherein the false-positive observation is caused by a beam of the lidar sensor that is associated with the lidar observation being deflected off of another object in the environment and reflecting off of the retroreflective surface back to the lidar sensor.

D. The vehicle as recited in any one of paragraphs A-C, wherein the lidar observation is one of multiple lidar observations proximate the location, the operations further comprising determining that a number of radar observations proximate to the location is less than a threshold number of radar observations, the threshold number of radar observations being based at least in part on a number of the multiple lidar observations proximate to the location.

E. A method comprising: receiving lidar data generated by a lidar sensor of a vehicle operating in an environment: receiving radar data generated by a radar sensor of the vehicle; determining, based at least in part on the lidar data, a location where a lidar observation has been received: determining, based at least in part on the radar data, an absence of a radar observation in proximity to the location: receiving an indication that a retroreflective surface is present in the environment; and determining, based at least in part on the retroreflective surface being present in the environment and based at least in part on the absence of the radar observation in proximity to the location, that the lidar observation is a false-positive observation.

F. The method as recited in paragraph E, wherein determining that the lidar observation is the false-positive observation comprises determining a probability that the lidar observation is the false-positive observation, wherein a value of the probability increases based at least in part on a determined number of factors present, the factors comprising: the retroreflective surface being present in the environment: the absence of the radar observation in proximity to the location: the location being located within an occluded portion of the environment: or a velocity associated with the lidar observation.

G. The method as recited in any one of paragraphs E-F, wherein determining that the lidar observation is the false-positive observation is further based at least in part on at least one of: a velocity associated with a potential object indicated by the lidar observation: or the location being positioned within an occluded region of the environment.

H. The method as recited in any one of paragraphs E-G, further comprising determining that the location where the lidar observation is indicated is within an occluded portion of the environment that is occluded by another object detected in the lidar data, the other object causing a deflection of a beam of the lidar sensor such that the beam contacts the retroreflective surface, wherein determining that the lidar observation is the false-positive observation is further based at least in part on the location being within the occluded portion of the environment.

I. The method as recited in any one of paragraphs E-H, wherein the lidar observation indicates a presence of a potential object in the environment in proximity to the retroreflective surface, the method further comprising determining, based at least in part on multiple frames of the lidar data, that the potential object is substantially motionless, wherein determining that the lidar observation is the false-positive observation is further based at least in part on the proximity to the retroreflective surface and the potential object being substantially motionless.

J. The method as recited in any one of paragraphs E-I, wherein the lidar sensor and the radar sensor generated, substantially contemporaneously, the lidar data and the radar data, respectively.

K. The method as recited in any one of paragraphs E-J, further comprising determining that the retroreflective surface is present in the environment based at least in part on at least one of map data, image data, or the lidar data.

L. The method as recited in any one of paragraphs E-K, further comprising determining a location of the retroreflective surface in the environment based at least in part on the at least one of the map data, the image data, or the lidar data, and wherein determining that the lidar observation is the false-positive observation is further based at least in part on determining that the location of the retroreflective surface is proximate to the location where the lidar observation has been received.

M. The method as recited in any one of paragraphs E-L, wherein determining that the lidar observation is the false-positive observation is further based at least in part on determining, for a series of frames of lidar data and radar data, a disparity in a number of radar observations relative to a number of lidar observations proximate to the location in the environment.

N. The method as recited in any one of paragraphs E-M, wherein the retroreflective surface is a retroreflective traffic sign in the environment.

O. The method as recited in any one of paragraphs E-N, further comprising determining, based at least in part on the indication that the retroreflective surface is present in the environment, that the retroreflective surface is proximate to at least one of the location or the vehicle.

P. One or more non-transitory computer-readable media storing instructions that, when executed, cause one or more processors to perform operations comprising: receiving lidar data generated by a lidar sensor of a vehicle operating in an environment: receiving radar data generated by a radar sensor of the vehicle: determining, based at least in part on the lidar data, a location in the environment where a lidar observation has been received: determining, based at least in part on the radar data, an absence of a radar observation in proximity to the location; receiving an indication that a retroreflective surface is present in the environment; and determining, based at least in part on the retroreflective surface being present in the environment and based at least in part on the absence of the radar observation in proximity to the location, that the lidar observation is a false-positive observation.

Q. The one or more non-transitory computer-readable media as recited in paragraph P, wherein determining that the lidar observation is the false-positive observation is further based at least in part on at least one of: a velocity associated with a potential object indicated by the lidar observation: or the location being positioned within an occluded region of the environment.

R. The one or more non-transitory computer-readable media as recited in any one of paragraphs P-Q, the operations further comprising determining that the location where the lidar observation is indicated is within an occluded portion of the environment that is occluded by another object detected in the lidar data, the other object causing a deflection of a beam of the lidar sensor such that the beam contacts the retroreflective surface, wherein determining that the lidar observation is the false-positive observation is further based at least in part on the location being within the occluded portion of the environment.

S. The one or more non-transitory computer-readable media as recited in any one of paragraphs P-R, wherein determining that the lidar observation is the false positive observation comprises determining a probability that the lidar observation is the false-positive observation, wherein a value of the probability increases based at least in part on a determined number of factors present, the factors comprising: the retroreflective surface being present in the environment: the absence of the radar observation in proximity to the location; the location being located within an occluded portion of the environment: or a velocity associated with the lidar observation.

T. The one or more non-transitory computer-readable media as recited in any one of paragraphs P-S, wherein the lidar sensor and the radar sensor generated, substantially contemporaneously, the lidar data and the radar data, respectively.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:

a lidar sensor;

a radar sensor;

one or more processors; and one or more non-transitory computer-readable media storing instructions that, when executed, cause the one or more processors to perform operations comprising:

receiving, from the lidar sensor, lidar data associated with an environment surrounding the vehicle;

receiving, from the radar sensor, radar data associated with the environment;

determining, based at least in part on the lidar data and the radar data, an absence of a radar observation proximate to a location in the environment where a lidar observation has been received;

determining that a retroreflective surface is proximate to the location;

determining, based at least in part on a velocity associated with the lidar observation, that the lidar observation is substantially stationary;

determining, based at least in part on at least one of (i) the absence of the radar observation proximate to the location, (ii) the retroreflective surface being proximate to the location, or (iii) the lidar observation being substantially stationary, a probability that the lidar observation is a false-positive observation; and based at least in part on the probability being greater than a threshold probability, precluding a bounding region associated with a potential object from being included in perception data, the perception data having an effect on a trajectory of the vehicle.

2. The vehicle of claim 1, the operations further comprising determining that the location is within an occluded portion of the environment from the lidar sensor, wherein determining the probability that the lidar observation is the false-positive observation is further based at least in part on the location being within the occluded portion of the environment.

3. The vehicle of claim 1, wherein the false-positive observation is caused by a beam of the lidar sensor that is associated with the lidar observation being deflected off of another object in the environment and reflecting off of the retroreflective surface back to the lidar sensor.

4. The vehicle of claim 1, wherein the lidar observation is one of multiple lidar observations proximate the location, the operations further comprising determining that a number of radar observations proximate to the location is less than a threshold number of radar observations, the threshold number of radar observations being based at least in part on a number of the multiple lidar observations proximate to the location.

5. A method comprising:

receiving lidar data generated by a lidar sensor of a vehicle operating in an environment;

receiving radar data generated by a radar sensor of the vehicle;

determining, based at least in part on the lidar data, a location where a lidar observation has been received;

determining, based at least in part on the radar data, an absence of a radar observation in proximity to the location;

receiving an indication that a retroreflective surface is present in the environment, the lidar observation indicating a presence of a potential object in the environment proximate the retroreflective surface; and determining, based at least in part on the retroreflective surface being present in the environment and based at least in part on the absence of the radar observation in proximity to the location, that the lidar observation is a false-positive observation.

6. The method of claim 5, wherein determining that the lidar observation is the false-positive observation comprises determining a probability that the lidar observation is the false-positive observation, wherein a value of the probability increases based at least in part on a determined number of factors present, the determined number of factors present comprising:

the retroreflective surface being present in the environment;

the absence of the radar observation in proximity to the location;

the location being located within an occluded portion of the environment; or a velocity associated with the lidar observation.

7. The method of claim 5, wherein determining that the lidar observation is the false-positive observation is further based at least in part on at least one of:

a velocity associated with the potential object indicated by the lidar observation; or the location being positioned within an occluded region of the environment.

8. The method of claim 5, further comprising determining that the location where the lidar observation is indicated is within an occluded portion of the environment that is occluded by a different object detected in the lidar data, the different object causing a deflection of a beam of the lidar sensor such that the beam contacts the retroreflective surface, wherein determining that the lidar observation is the false-positive observation is further based at least in part on the location being within the occluded portion of the environment.

9. The method of claim 5, further comprising determining, based at least in part on multiple frames of the lidar data, that the potential object is substantially motionless, wherein determining that the lidar observation is the false-positive observation is further based at least in part on the proximity to the retroreflective surface and the potential object being substantially motionless.

10. The method of claim 5, wherein the lidar sensor and the radar sensor generated, substantially contemporaneously, the lidar data and the radar data, respectively.

11. The method of claim 5, further comprising determining that the retroreflective surface is present in the environment based at least in part on at least one of map data, image data, or the lidar data.

12. The method of claim 5, wherein determining that the lidar observation is the false-positive observation is further based at least in part on determining, for a series of frames of lidar data and radar data, a disparity in a number of radar observations relative to a number of lidar observations proximate to the location in the environment.

13. The method of claim 5, wherein the retroreflective surface is a retroreflective traffic sign in the environment.

14. The method of claim 5, further comprising determining, based at least in part on the indication that the retroreflective surface is present in the environment, that the retroreflective surface is proximate to at least one of the location or the vehicle.

15. One or more non-transitory computer-readable media storing instructions that, when executed, cause one or more processors to perform operations comprising:

receiving lidar data generated by a lidar sensor of a vehicle operating in an environment;

receiving radar data generated by a radar sensor of the vehicle;

determining, based at least in part on the lidar data, a location in the environment where a lidar observation has been received, the location being within an occluded portion of the environment;

determining, based at least in part on the radar data, an absence of a radar observation in proximity to the location;

receiving an indication that a retroreflective surface is present in the environment; and determining, based at least in part on the retroreflective surface being present in the environment and based at least in part on the absence of the radar observation in proximity to the location, that the lidar observation is a false-positive observation.

16. The one or more non-transitory computer-readable media of claim 15, wherein determining that the lidar observation is the false-positive observation is further based at least in part on at least one of:

a velocity associated with a potential object indicated by the lidar observation; or the location being positioned within an occluded region of the environment.

17. The one or more non-transitory computer-readable media of claim 15, the operations further comprising determining that the location is occluded by a second object detected in the lidar data, the second object causing a deflection of a beam of the lidar sensor such that the beam contacts the retroreflective surface, wherein determining that the lidar observation is the false-positive observation is further based at least in part on the location being within the occluded portion of the environment.

18. The one or more non-transitory computer-readable media of claim 15, wherein determining that the lidar observation is the false-positive observation comprises determining a probability that the lidar observation is the false-positive observation, wherein a value of the probability increases based at least in part on a determined number of factors present, the determined number of factors present comprising:

the retroreflective surface being present in the environment;

the absence of the radar observation in proximity to the location;

the location being located within the occluded portion of the environment; or a velocity associated with the lidar observation.

19. The one or more non-transitory computer-readable media of claim 15, wherein the lidar sensor and the radar sensor generated, substantially contemporaneously, the lidar data and the radar data, respectively.

20. A method comprising:

receiving lidar data generated by a lidar sensor of a vehicle operating in an environment;

receiving radar data generated by a radar sensor of the vehicle;

determining, based at least in part on at least one of the lidar data, map data, or image data, a first location where a lidar observation has been received;

determining, based at least in part on the radar data, an absence of a radar observation in proximity to the first location;

receiving an indication that a retroreflective surface is present in the environment;

determining a second location of the retroreflective surface in the environment based at least in part on at least one of the map data, the image data, or the lidar data; and determining, based at least in part on the retroreflective surface being present in the environment, the absence of the radar observation in proximity to the first location, and determining that the second location of the retroreflective surface is proximate to the first location, that the lidar observation is a false-positive observation.

* * * * *